United States Patent [19]

Takamizawa

[11] Patent Number: 4,542,746
[45] Date of Patent: Sep. 24, 1985

[54] ULTRASONIC DIAGNOSTIC APPARATUS

[75] Inventor: Kinya Takamizawa, Yokohama, Japan

[73] Assignee: Tokyo Shibaura Denki Kabushiki Kaisha, Kawasaki, Japan

[21] Appl. No.: 469,315

[22] Filed: Feb. 24, 1983

[30] Foreign Application Priority Data

Feb. 24, 1982 [JP] Japan .................................. 57-28646

[51] Int. Cl.$^4$ ............................................... A61B 10/00
[52] U.S. Cl. ........................................ 128/660; 73/626
[58] Field of Search ................................ 128/660–663; 73/620, 625–626

[56] References Cited

U.S. PATENT DOCUMENTS

| | | |
|---|---|---|
| 3,919,683 | 11/1975 | Itamura . |
| 4,127,034 | 11/1978 | Lederman et al. . |
| 4,186,747 | 2/1980 | Iinuma .................................. 128/660 |
| 4,212,206 | 7/1980 | Hartemann et al. ............ 128/660 X |
| 4,240,295 | 12/1980 | Uranishi .......................... 128/660 X |
| 4,258,574 | 3/1981 | Hildebrand et al. . |
| 4,398,422 | 8/1983 | Haerten .......................... 128/660 X |
| 4,431,007 | 2/1984 | Amazeen et al. ..................... 128/660 |
| 4,440,025 | 4/1984 | Hayakawa et al. ............. 128/660 X |

FOREIGN PATENT DOCUMENTS

| | | |
|---|---|---|
| 6884081 | 10/1981 | Australia . |
| 2848467 | 5/1979 | Fed. Rep. of Germany . |
| 5075058 | 11/1973 | Japan . |
| 2053475 | 2/1981 | United Kingdom . |

OTHER PUBLICATIONS

*Acoustical Holography*, vol. 5, Plenum Press, 1974, W. R. Fenner et al., "An Ultrasonic Holographic Imaging System For Medical Applications", pp. 481–492.

*Primary Examiner*—Kyle L. Howell
*Assistant Examiner*—Francis J. Jaworski
*Attorney, Agent, or Firm*—Oblon, Fisher, Spivak, McClelland & Maier

[57] ABSTRACT

In an ultrasonic diagnostic apparatus using an array type transducer probe, wherein improved tomographic image resolution is desired by electronically focusing ultrasonic wave toward an object to be examined in both directions, i.e., the array direction and the lens direction. During first scanning of the ultrasonic transducer array in the array direction, the signals received from the probe are synthesized in phase with respect to each other via delay lines having predetermined delay times to obtain first scanned signals in real time, so that focusing the reflected ultrasonic wave can be electronically accomplished in the array direction. After this first scanning, the probe is mechanically moved to a given position in the lens direction normal to the array direction. Then a second scanning operation is accomplished to obtain similar first scanned signals. All of the first scanned signals are processed by a delay time control circuit, digitized, and then stored. Finally, all of the stored first scanned signals are read out and synthesized in phase with respect to each other by an adder circuit to obtain second scanned signals, so that focusing the reflected ultrasonic wave can be accomplished in the lens direction. The resultant second scanned signals are converted into analogue signals to be displayed as a tomographic image of the desired diagnostic part in the object.

12 Claims, 17 Drawing Figures

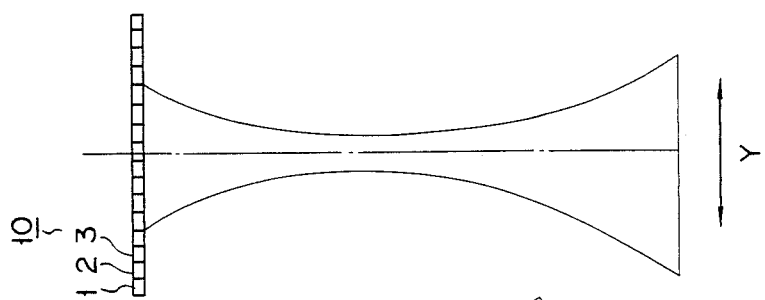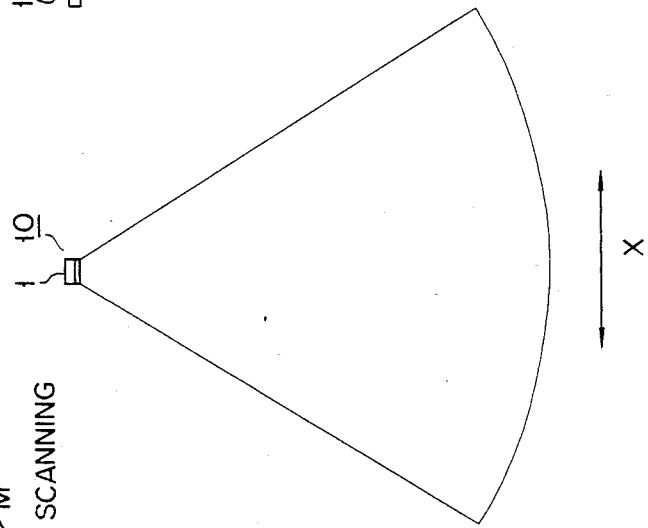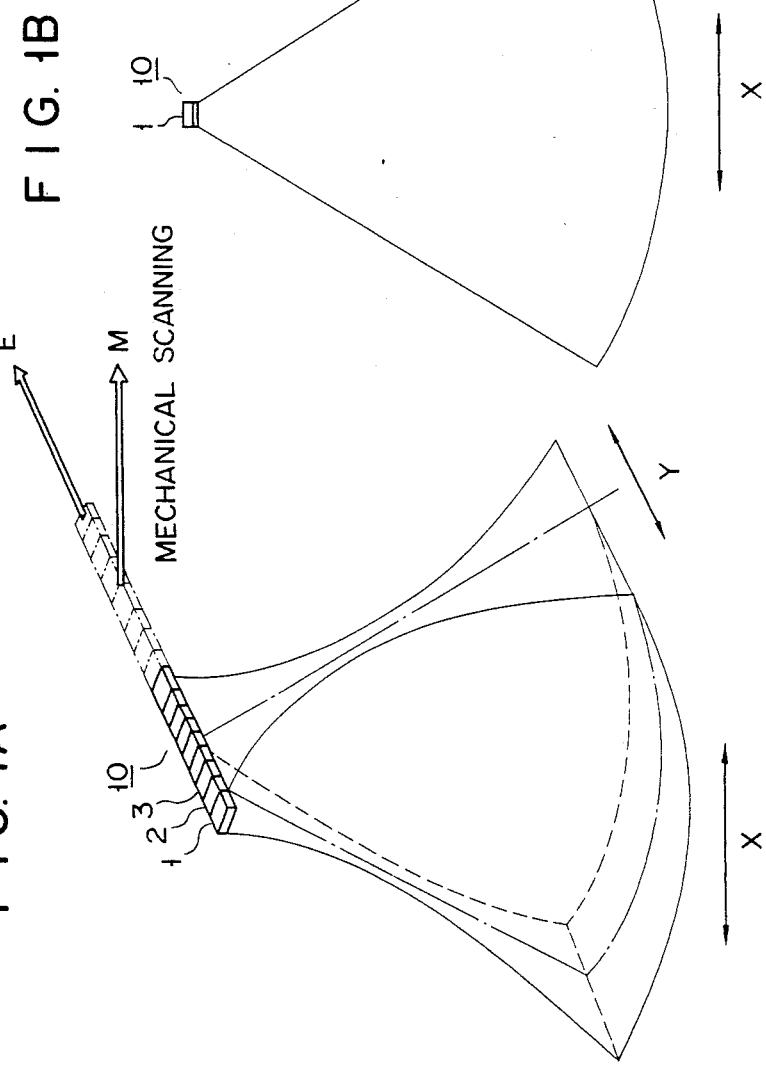

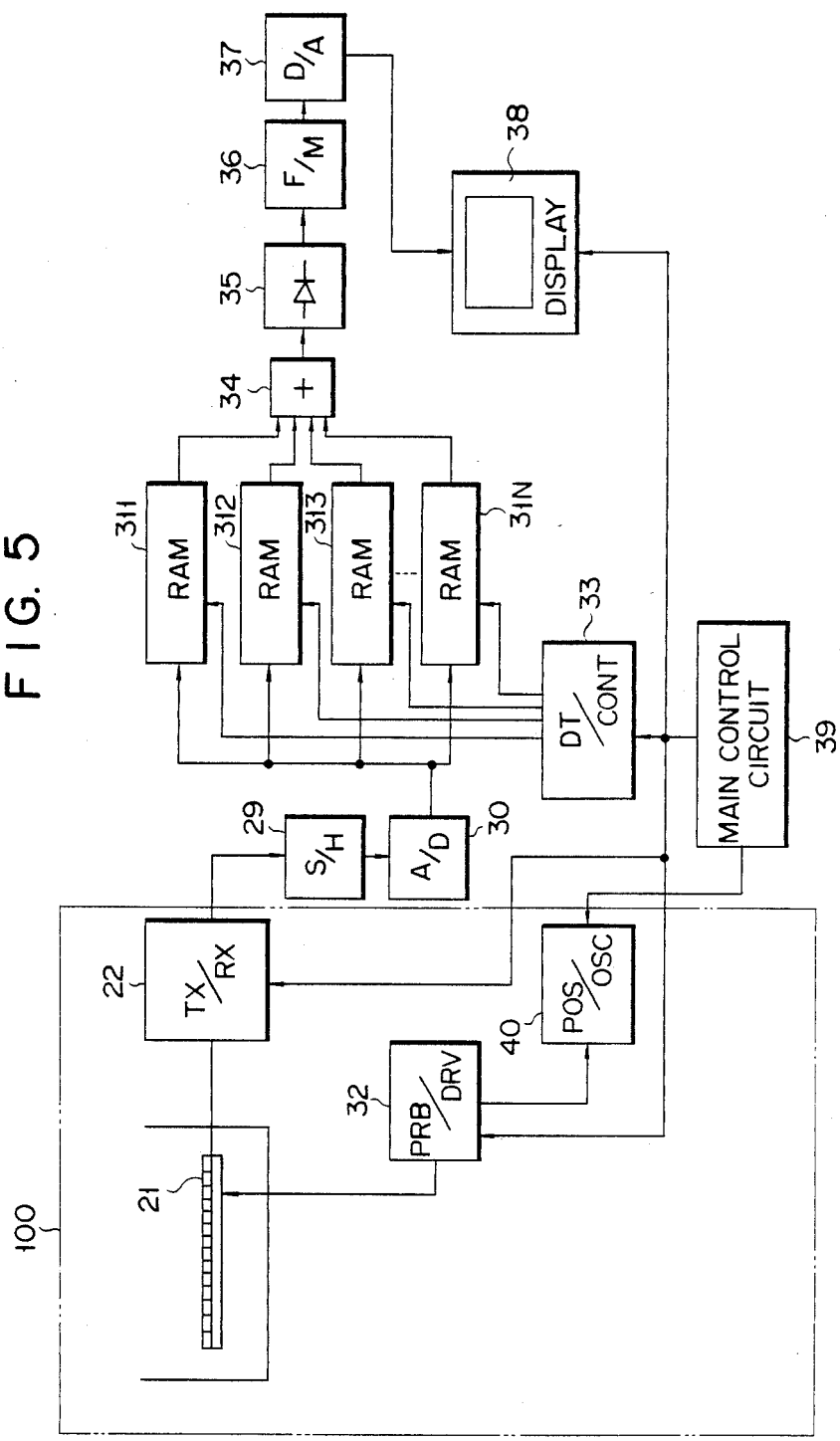
F I G. 5

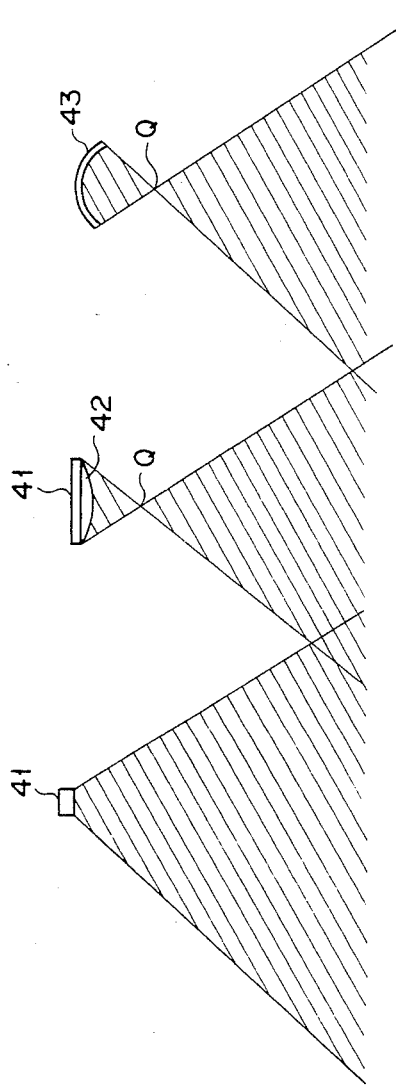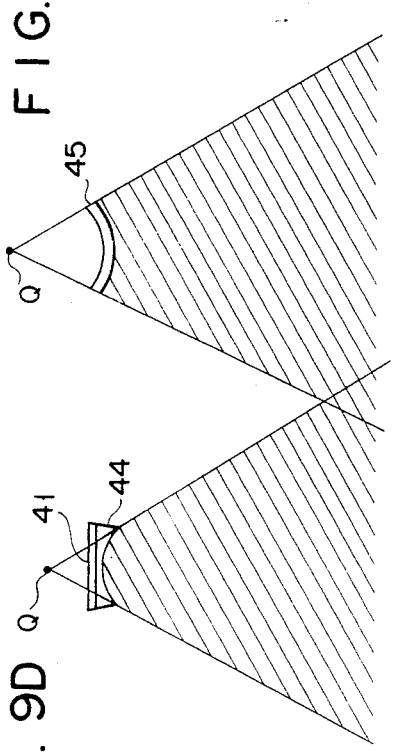

ULTRASONIC DIAGNOSTIC APPARATUS

BACKGROUND OF THE INVENTION

1. Field of the Invention

This invention generally relates to an ultrasonic diagnostic apparatus for obtaining a tomographic image of an object such as a human body by means of ultrasonic scanning, and more particularly relates to an ultrasonic diagnostic apparatus realizing higher bearing resolution by mechanically moving the array type ultrasonic probe in a direction perpendicular to the array direction along which a plurality of ultrasonic transducer elements are disposed.

2. Description of the Prior Art

An ultrasonic diagnostic method is well known and used to examine an object such as a patient. According to this method, ultrasonic pulses are radiated toward a patient, and ultrasonic pulses reflected by boundaries between body organs which have different acoustic characteristics (acoustic impedance) are received to obtain diagnostic information relating to the organs. Since such an ultrasonic diagnostic method is in noninvasive, a patient being so examined feels substantially no pain. Furthermore, as compared with the conventional X-ray radiation diagnosis, ultrasonic diagnosis causes substantially no trouble of X-ray exposure and easily provides a tomographic image of soft organ tissues. As a result, recently, the ultrasonic diagnostic method has been widely employed.

An actual apparatus for practicing ultrasonic diagnosis is known as an ultrasonic diagnostic apparatus. In order to improve a bearing resolution in a conventional linear scanning type ultrasonic diagnostic apparatus, so-called an electronic focusing method is adopted in which the ultrasonic transducer elements such as piezoelectric elements are sequentially driven by drive signals along the transducer element alignment direction (to be referred to as an "array direction" hereinafter) which have been adjusted by relative delay times, so as to transmit and receive ultrasonic pulses. Furthermore, a focusing method is also known in which the focusing position is sequentially moved along the ultrasonic pulse propagation direction so as to obtain a uniform resolution for any depth in the object. This known method is disclosed, e.g., in U.S. Pat. No. 3,919,683 issued on Nov. 11, 1975.

Meanwhile, a focusing method which uses an acoustic lens is adopted in a direction perpendicular to the array direction (referred to a "lens direction" hereinafter). However, the focal point is fixed according to this type of focusing method using such a lens, so that the resolution of the region spaced apart from the focal point cannot be improved.

The present invention is to eliminate the conventional drawbacks and has for its object to provide an ultrasonic diagnostic apparatus wherein a focal point of an ultrasonic beam can be easily adjusted, and the focal point can be constantly and properly positioned in a vicinity of the region to be examined, thereby obtaining better resolution of a tomographic image.

SUMMARY OF THE INVENTION

An ultrasonic diagnostic apparatus according to the present invention comprises: an array type ultrasonic probe having a plurality of ultrasonic transducer elements that are disposed along a first direction, being capable of transmitting ultrasonic wave toward the object, and being capable of receiving ultrasonic wave reflected from the object; means for electronically scanning the ultrasonic transducers of the ultrasonic probe in the first direction and for electronically synthesizing the signals from the reflected echo ultrasonic probe in-phase with respect to each other to obtain first scanned signals in real time, thus focusing the reflected ultrasonic wave being effected in the first direction; means for mechanically and intermittently by moving the ultrasonic probe along a second direction perpendicular to the first direction so as to obtain the first scanned signals over the second direction; and means for electronically synthesizing the first scanned signals in-phase with respect to each other to produce second scanned signals, thus focusing the reflected ultrasonic wave in the second direction.

According to the ultrasonic diagnostic apparatus of the present invention, an array type ultrasonic probe is mechanically moved in a direction perpendicular to the array direction along which a plurality of ultrasonic transducer elements are disposed, and electronic means is used to focus the ultrasonic beam in the array direction as well as in the direction perpendicular thereto. Therefore, the ultrasonic diagnostic apparatus according to the present invention has an advantage in that the focal point of the ultrasonic beam can be easily adjusted in any one of the two directions and at a relatively high speed, thereby constantly and properly positioning the focal point in the region to be examined and hence providing a tomographic image of improved resolution.

Furthermore, the ultrasonic diagnostic apparatus according to the present invention has another advantage in that the resolution of the tomographic image does not depend on a distance (depth of the portion to be examined), thereby constantly providing a tomographic image of improved resolution.

BRIEF DESCRIPTION OF THE DRAWINGS

The invention is best understood by reference to the accompanying drawings, in which:

FIGS. 1A to 1C schematically illustrate an arrangement of an array type transducer and a diagram for displaying ultrasonic beam width generated by the transducer;

FIG. 5 shows a block diagram of the overall circuit including the circuit arrangement shown in FIG. 4 of the ultrasonic diagnostic apparatus according to the invention;

FIGS. 9A to 9E illustrate diagrams for explaining how to obtain ultrasonic wide beam width by using the transducer while keeping the aperture large in size.

DETAILED DESCRIPTION OF THE PREFERRED EMBODIMENT

Figure 3A:
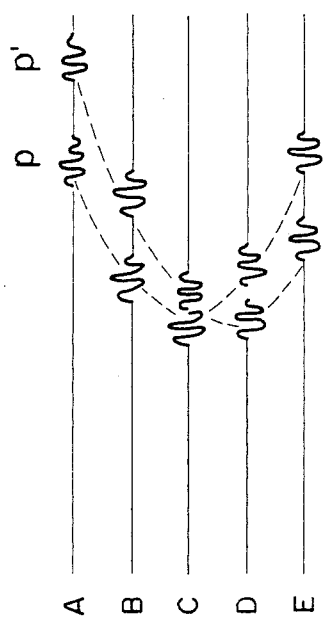
FIG. 2 and FIGS. 3A to 3C schematically illustrate a diagram for explaining the principle operation of one preferred embodiment of the ultrasonic diagnostic apparatus in the lens direction according to the invention.

Before proceeding with a description of the preferred embodiments according to the invention, the principle of operation of the invention will be described as follows. In the ultrasonic diagnostic apparatus utilizing the ultrasonic probe according to the invention, so as to improve the lateral resolution, focusing of the ultrasonic wave in the array direction is accomplished by the electronic synthesizing means on the received signals from the array transducer which is electronically scanned in the array direction, and further focusing of the ultrasonic wave in the lens direction perpendicular to the array direction is accomplished by also the electronic synthesizing means on the received signals obtained from the array transducer during mechanically and intermittently moving along the lens direction.

In one preferred embodiment, after applying the predetermined first delay times to the signals received from the transducer array, the thus processed reception signals are electronically synthesized in phase with respect to each other so as to focus the ultrasonic wave in the array direction, and, on the other hand, the processed reception signals obtained during each scanning in the array direction are stored in the memory and thereafter read out therefrom for synthesizing them in phase with respect to each other by applying the predetermined second delay times thereto so as to focus the ultrasonic wave in the lens direction.

In another preferred embodiment, the reception signals obtained from the array transducer which is scanned in the array direction and the lens direction are convoluted.

FIG. 1 schematically illustrates an ultrasonic array transducer elements and the focusing the ultrasonic beams width emitted therefrom.

As shown in FIGS. 1A to 1C, in an array type ultrasonic probe 10 used in the present invention, beam focusing is performed by the electronic focusing method in a transducer elements alignment direction, that is, an array direction (also referred to Y direction), whereas wide beam ultrasound focusing is performed along a direction (referred to lens direction, or X direction) perpendicular to the array direction. As previously stated, this X direction corresponds to the lens direction, and Y direction corresponds to the array direction, the X direction being perpendicular to Y direction. Reference numerals 1, 2, 3, and so on denote transducer elements aligned in the array direction; an arrow E, an electronic scanning direction in the Y direction; and an arrow M, a mechanical scanning direction along the X direction.

Figure 2:
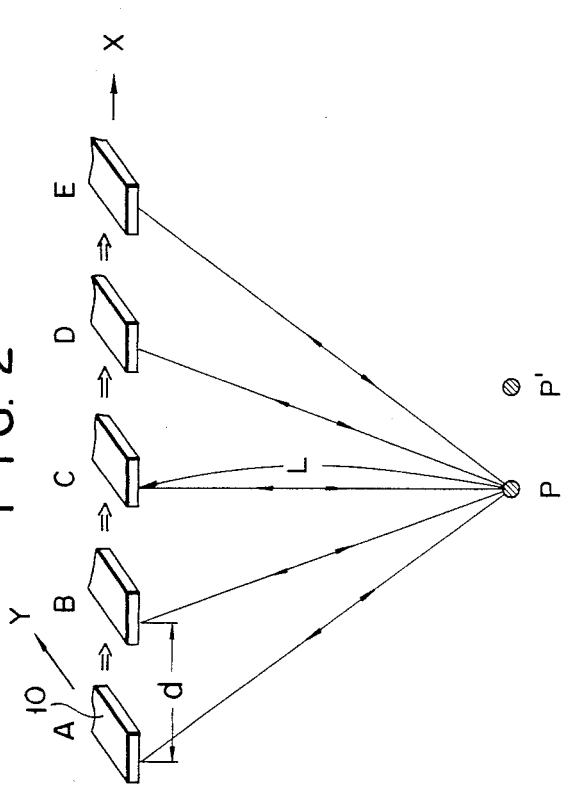

FIG. 2 shows a diagram for explaining the principles of operation in the X direction of a preferred embodiment of the ultrasonic diagnostic apparatus. The transducer probe 10 is mechanically moved to points A, B, C, D and E in the order named along the X direction while emitting ultrasonic pulses. The probe 10 then receives a reflected ultrasonic wave from a reflective object P disposed just below the point C. In this case, even if the reflective object P is disposed under any one of the points A to E, it will fall within a width of the ultrasonic beams emitted from the probe 10.

Referring to FIG. 2, consider the case when an ultrasonic pulse is radiated from the probe 10 positioned at the point A or E. A time interval elapsing from a first instant at which the ultrasonic pulse is emitted from the probe 10 and until a second instant at which the ultrasonic pulse reflected from the reflective object "P" is received by the same again, is given by the following equation:

$$t_A = t_E = (2/v) \sqrt{(2d)^2 + L^2} \tag{1}$$

Similarly, when the probe 10 is positioned at the point B or D, a time interval which elapses from the emission of the ultrasonic pulse to the reception of the reflected pulse, is given by the following equation:

$$t_B = t_D = (2/v) \sqrt{d^2 + L^2} \tag{2}$$

Furthermore, when the probe 10 is positioned at the point C, a time interval which elapses from the emission of the ultrasonic pulse to the reception of the reflected pulse, is given by the following equation:

$$t_C = (2/v)L \tag{3}$$

where d is the movement pitch of the probe 10, L is the depth or the distance between the point C and the reflective object P, and v is an ultrasonic wave propagation velocity in a given medium.

The signals obtained at the points A to E are delayed for correction delay times given by the appropriate formulae, which respectively correspond to time intervals $t_A$ to $t_E$ so as to coincide the phases of those signals with respect to each other indicating the reflected ultrasonic waves from the reflective object P. Only the reflected waves are then synthesized with respect to each other to have the same phase as will be described later more in detail. Therefore, only the signals from the reflective object P are emphasized in comparison with interfering reflected signals, and are therefore distinguished therefrom. As a result, only the signals reflected by the reflective object P can be properly detected.

The correction delay times $\tau_B$ or $\tau_D$, and $\tau_C$ to be applied at the points B or D and C, respectively, when the reception signal at the point A or E is considered to be the reference signal, are given as follows:

$$\tau_B = \tau_D = (2/v) \{ \sqrt{(2d)^2 + L^2} - \sqrt{d^2 + L^2} \} \tag{4}$$

$$\tau_C = (2/v) \{ \sqrt{(2d)^2 + L^2} - L \} \tag{5}$$

Figure 3B:
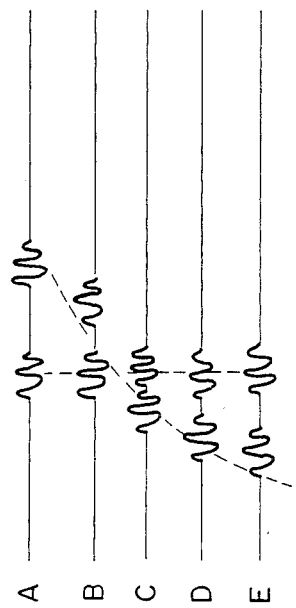
Figure 3C:
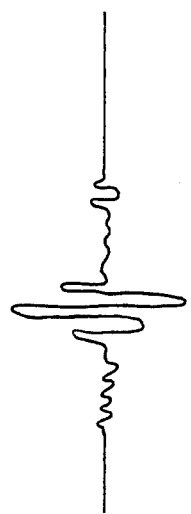

FIGS. 3A and 3B schematically show reception signals at the points A to E when another reflective object P' is present adjacent to the reflective object P and at the same depth L (FIG. 2). The abscissa schematically designates the reception signal waveforms at the points A to E and corresponds to address positions of a memory. FIG. 3A shows the signals before time delay correction; FIG. 3B shows the signals after time delay correction; and FIG. 3C shows a composite signal obtained by synthesizing the corrected signals. According to the composite signal shown in FIG. 3C, the signals reflected by the reflective object P are emphasized and can therefore be distinguished from reflective signals from other objects.

Figure 4:
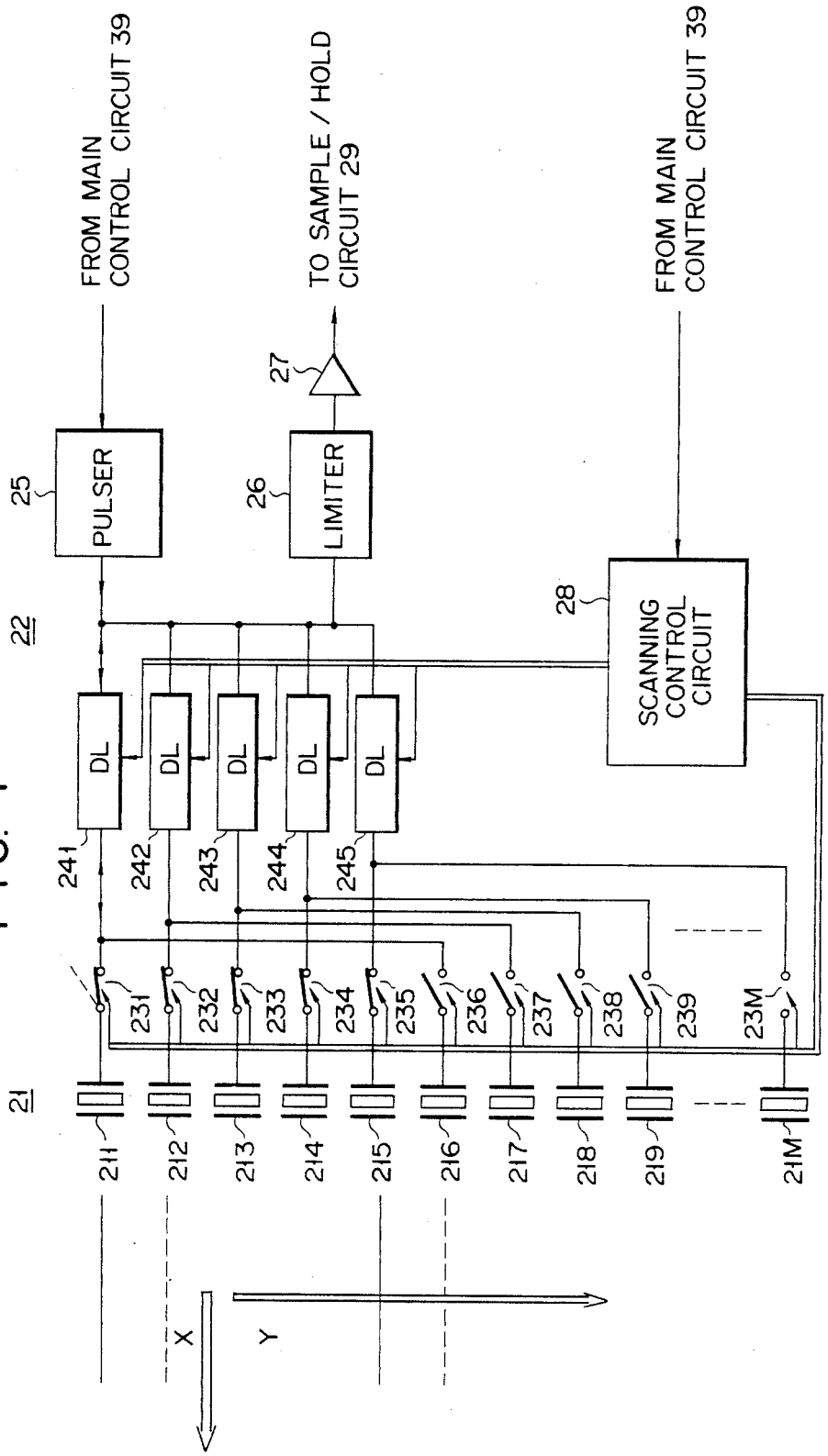
FIG. 4 shows a block diagram of the ultrasonic transmitter/receiver circuit and the ultrasonic probe associated with the transmitter/receiver circuit of one preferred embodiment of the apparatus according to the invention.

FIG. 4 shows a block diagram of a preferred embodiment of an array type ultrasonic probe 21 and an ultrasonic wave transmitter/receiver circuit 22 which can transmit and receive the ultrasonic waves through the probe 21. FIG. 5 is a block diagram of the overall circuit, including the probe 21 and the ultrasonic wave transmitter/receiver circuit 22, of the ultrasonic diagnostic apparatus according to the present invention.

Referring to FIG. 4, the probe 21 has a plurality of transducer elements 211, ... 219, ... and 21M which are aligned in line. A plurality of electronic switches 231, . . ., 239, ... and 23M are respectively connected to the transducer elements 211, ... 219, ... and 21M, the total numbers of the switches being equal to that of the elements. Each of the transducer elements 211 to 215 is connected to one end of the corresponding one of the delay lines 241 to 245 through the corresponding one of the electronic switches 231 to 235. The other end of each of the delay lines 241 to 245 is connected to the input end of a pulser 25 and also to the input end of a limiter 26. The transducer elements 216, ... 219, ... and 21M and the electronic switches 236, ... 239, ... and 23M are respectively grouped into groups of five transducer elements and of five electronic switches. Each group of transducer elements is connected to the pulser 25 and the limiter 26 through the corresponding group of electronic switches and the corresponding group of delay lines in the same manner as the transducer elements 211 to 215 and the electronic switches 231 to 235. Reference numeral 27 denotes a preamplifier; 28, a scanning control circuit.

Now the operation of this embodiment will be explained.

In the transmission mode, a driving pulse having normally a value of several hundreds voltage and consisting of a single pulse is produced by the pulser 25. The driving pulse is supplied to the transducer elements 211 to 215 through the delay lines 241 to 245 respectively when the electronic switches 231 to 235 are turned on (closed). The ultrasonic pulses are generated simultaneously by the transducer elements 211 to 215 upon receiving this driving pulse.

The ultrasonic pulses reflected by e.g., the reflective object P in the medium shown in FIG. 2 are received by the transducer elements 211 to 215 of the first group pass through the electronic switches 231 to 235 and the delay lines 241 to 245 and are synthesized in phase with respect to each other. These synthesized signals are then supplied to the preamplifier 27 through the limiter 26. The limiter 26 enables pulses which have an excessive magnitude such as a high-voltage pulse from the pulser 25 not to be supplied to the preamplifier 27.

In this case, the both ends of the delay lines 241 and 245 are short-circuited so as to set zero delay time, the delay times at the delay lines 242 and 244 are set in accordance with the equation (4), and that at the delay line 243 in accordance with the equation (5). It should be noted that each delay line 241 to 245 is capable of having various delay times which are determined by e.g. the equations (4) and (5). In this manner, electronic focusing can be accomplished for the ultrasonic wave beam.

The thus obtained output of the preamplifier 27 is supplied to a sample/hold circuit 29 to be described later with reference to FIG. 5 and is then converted by an A/D converter 30 to a digital signal. This digital signal is stored in a first RAM (random access memory) 311.

At the next scanning step in the circuit shown in FIG. 4, the operation as previously stated is performed again when the electronic switch 231 is turned off (opened) and the electronic switch 236 is turned on (closed). That is, the both ends of the delay lines 241 and 242 are short-circuited (i.e., zero delay time), so that the delay lines 243 and 245 are set in accordance with equation (4) and the delay line 244 is set in accordance with equation (5). The transducer elements 212 to 216 are simultaneously driven to perform the transmission and reception of the ultrasonic waves. The reception signal thus obtained in this scanning step is also converted into a digital signal and is then stored in the first RAM 311.

As described above, the transducer elements 211, ... 219, ... and 21M are driven such that five transducer elements which are simultaneously driven are sequentially shifted by one in the Y direction until the final group of transducer elements 21(M−4) to 21M is finally driven. As a result, simultaneous driving is repeated (M−4) times. The signals obtained by the repeated operation are stored in the first RAM 311. In other words, all the reception signals are stored in the first RAM 311 when the transducer elements are scanned along the array direction (Y direction) at the first position of the lens direction (X direction).

The probe 21 is then moved by an appropriate mechanical means (not shown) in the X direction by one step "d" (for example "d"=1 mm) so as to scan the transducer elements at the second position thereof. The electronic scanning is performed at the second position in the same manner as in the first position along the Y direction. It is then repeated (M−4) times along the Y direction. Thus obtained signals in the form of digital signals are stored in the second RAM 312.

In this manner, the probe 21 is interruptedly shifted by (N−1) steps in the lens direction (X direction). A series of the reception signals of the respective steps are sequentially stored in the first RAM 311 to the last 31N in the order named.

Figure 6:
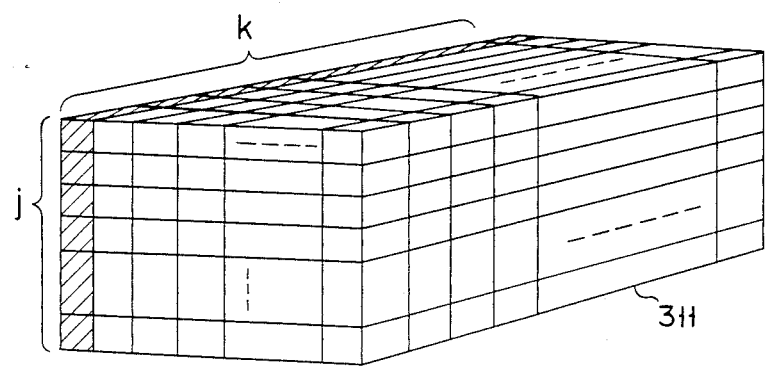
FIG. 6 is a schematical illustration for indicating the internal construction of the memory circuit which may be employed to the apparatus in FIG. 5.

FIG. 6 is a schematic illustration for indicating the internal construction of, for example, the first RAM 311. Data stored in the RAM 311 is three-dimensional data in which "j" bits are allocated to store the amplitude data, "k" bits are the depth data, and "M−4" bits are the data in the array direction, respectively.

If the memory area along the depth direction is defined as L max and the sampling pitch is "ΔX", the following equation is satisfied K=L max/Δx. Sampling must be performed such that the reception signal satisfies the sampling theorem. If the maximum frequency component of the reception signal is $f_h$ and the sampling frequency is $f_s$, the following inequality is given:

$$f_s \geq 2f_h \tag{6}$$

and $$f_s = v/2\Delta x \tag{7}$$

The operation will be described in which the signals stored in the RAM 311 to 31N are superposed to perform the beam focusing in the lens direction.

Since the signals which have been stored in the RAM's 311 to 31N are obtained after the beam focusing is completed along the array direction, the signals are superposed on each other to perform delay time correction between the signals obtained by mechanically moving the probe 21 to scan a given group of transducer elements (e.g., the transducer elements 211 to 215) along the lens direction, thereby performing the beam focusing in the lens direction.

A case will be described in which first signals in the array direction in the RAMs 311 to 31N (as indicated by the hatched portion in the RAM 311 in FIG. 6) are used for the beam focusing.

The principles of operation have been explained with reference to FIGS. 2, 3A and 3B. Here, more particularly, delay time correction can be performed by accessing addresses of the RAMs 311 to 31M. A delay time control circuit 33 accesses the RAMs 311 to 31N.

Correction precision may depend on sampling period $T_s$ of the sample/hold circuit 29, and a correction tolerance $\Delta\tau$ is given as follows:

$$\Delta\tau \leq (T_s/2) \tag{8}$$

The sampling frequency can be determined by the following formula besides formula (7):

$$f_s = (1/T_s) \leq (\tfrac{1}{2}\Delta\tau) \tag{9}$$

Referring to FIG. 5, a synthesized signal is produced by a digital adder 34. The output signal is detected by a detection circuit 35 for delivering its envelope signal. The envelope signal is then stored in a frame memory 36. Digital signals corresponding to one or a plurality of images to be displayed on a display unit 38 such as a cathode ray tube are stored in the frame memory 36. The output from the frame memory 36 is converted by a D/A converter 37 to an analog video signal which is then displayed on the display unit 38. If the output from the frame memory 36 matches with the TV format, the output can be displayed on a general TV monitor. It should be noted that reference numeral 39 denotes a main control circuit and reference numeral 40 denotes a probe position signal generator in FIG. 5.

In this embodiment as described above, the phased-array type ultrasonic probe is scanned along the lens and array directions to electronically perform the beam focusing in the both conditions, so that the focal point can be shifted at any position. As a result, the region to be examined can be constantly and properly positioned at the focal point, thereby obtaining a tomographic image of improved resolution.

In this embodiment, since the focal point can be freely determined in either of the array and lens directions at a considerably high speed, it is a great advantage for the apparatus when used in the C mode method.

The above advantage lies in the fact that the data bits, K, in the depth direction are greatly decreased in the C mode method as compared with that in the B mode method. Furthermore, in this case, since the resolution of the image is mainly determined by lateral resolutions along the array and lens directions, the application of the present invention entails a great advantage.

Figure 7:
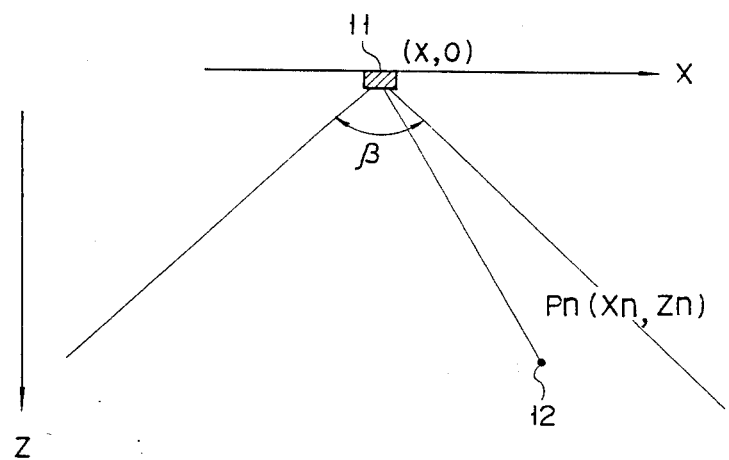
FIG. 7 illustrates a diagram for explaining the principle of the synthetic aperture method which may be employed according to another embodiment of the ultrasonic diagnostic apparatus according to the invention.

Now the second embodiment will be explained with reference to FIGS. 7 and 8.

This embodiment is a case in which the principles of operation of the synthetic aperture method used in the field of radar techniques are applied to the ultrasonic diagnostic apparatus according to the invention. The principles of the operation of the synthetic aperture method in a wide beam width will be described with reference to FIG. 7.

A transducer 11 performs electric switching or mechanically moves along the X-axis to transmit and receive the ultrasonic pulses along the Z-axis. Now assume that a reflective object 12 (reflective coefficient $\gamma_n$) is located at a point Pn (Xn, Zn) in the X-Z axis of coordinates. An ultrasonic wave St emitted from the transducer 11 positioned at a position (X, 0) is reflected from the point Pn, and a reflected signal is received by the transducer 11. In this case, the reception signal $S_r$ is expressed as follows:

$$S_r = \gamma_n f(t-t_1)\sin\{\omega_0(t-t_1)\} \tag{10}$$

for $t \approx (2Zn/V) + (1/ZnV)(x-Xn)^2 = t_1$

The transmission signal St(t) is expressed as follows:

$$St(t) = f(t)\sin\omega_0 t$$

for $\omega_0 = 2\pi f_0$ and V = ultrasound velocity where $f_0$ is the center frequency of the ultrasonic pulses, and f(t) is an envelope of the ultrasonic pulses. The reception signal $S_r$ expressed by the equation (10) is demodulated in synchronism with reference signals $\sin\omega_0 t$ and $\cos\omega_0 t$ which have the same frequency as the center frequency $f_0$. The high-frequency component ($2\omega_0$) of the reception signal is then filtered away by filters 128a, 128b. The filtered output $S_r'$ is thus expressed by the following equation:

$$S_r' = S_{rr} + jS_{ri} = (\gamma_n/2)f(t-t_1)e^{-j\omega_0 t_1} \tag{11}$$

where $S_{rr}$ is the real part of the reception signal component, and $S_{ri}$ is the imaginary part thereof.

The output signal $S_r'$ is convoluted on the reference hologram signal Sc, so that the image at the point Pn is reconstructed. The general equation on this reconstruction is as follows:

$$A(S, Z) = \int_{-l/2}^{l/2} (S_r' \times Sc)dx \tag{12}$$

for $Sc = e^{j\omega_0\{(x-S)^2/ZV\}}$ for $Sc = e^{j\omega_0\{(x-S)^2/ZV\}}$ where $l(\approx Z\beta)$ is the integration range, and $\beta$ is a beam width of the transducer 11. Therefore, for example in the condition Z=Zn:

$$|A(s, Zn)| = \gamma_n|[\sin\{2\pi l(S-Xn)\}/\lambda Zn]/[2\pi(S-Xn)/\lambda Zn]| \tag{13}$$

The above equation indicates that the image from the reflective object 12 at the point Pn for S=Xn and Z=Zn can be reconstructed on a display plane S-Z, S corresponding to X axis of the coordinates.

Now the operation of the second embodiment will be explained with reference to FIG. 8.

Figure 8:
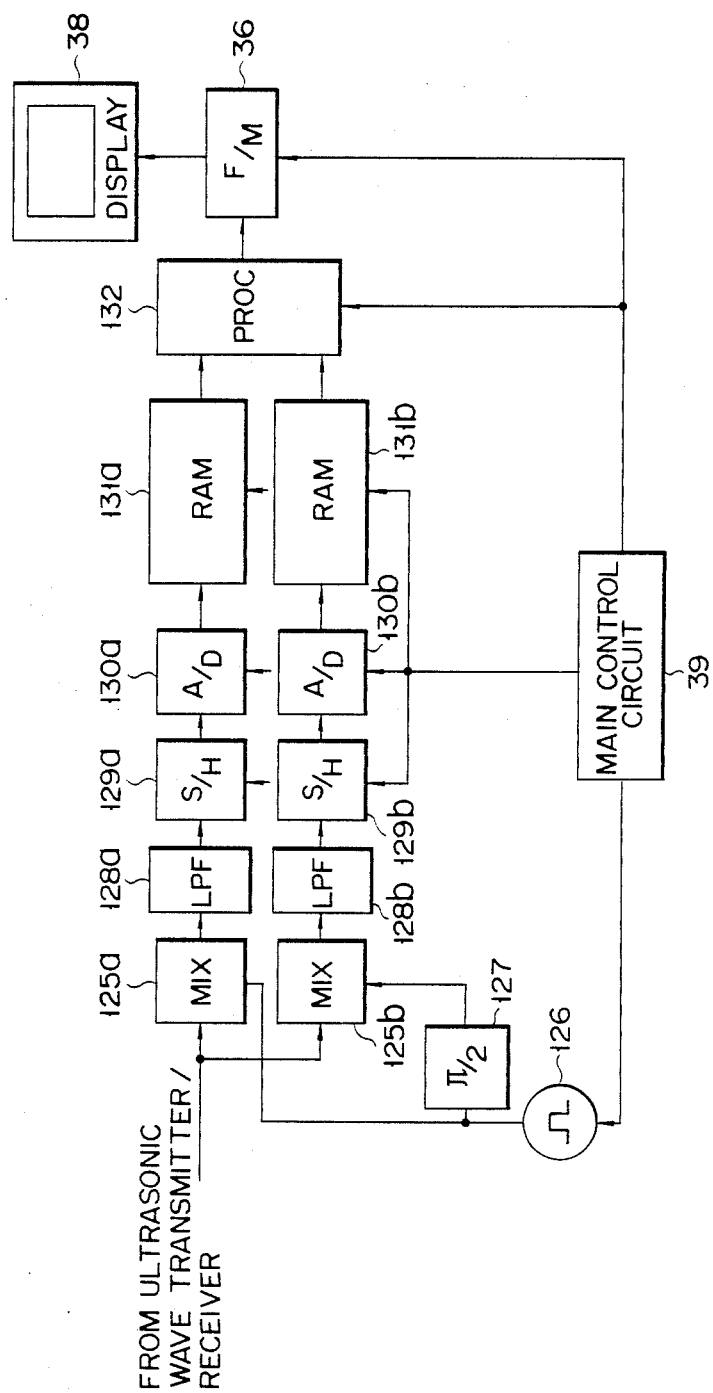
FIG. 8 shows a block diagram of the another embodiment of the ultrasonic diagnostic apparatus according to the invention.

It should be noted that since the ultrasonic transducer array (probe) and its driving circuit which are encompassed by a line 100 in FIG. 5 are commonly-used in this embodiment, they are not shown in FIG. 8 for the sake of simplicity. Consequently because the construction for transmitting/receiving the ultrasonic waves is completely identical to that of the above-mentioned first embodiment, the detailed explanation thereof is omitted.

As previously stated in FIGS. 4 and 5, the transducer 21 as the array type ultrasonic probe has a plurality of transducer elements 211, . . . 212, . . . 21M which are linearly aligned. A plurality of electronic switches 231, . . . 232, . . . 23M are connected to the transducer elements 211, . . . 212, . . . 21M, respectively. In this embodiment, each one of the transducer elements 211, . . . 212, . . . 21M is sequentially driven by controlling the corresponding one of the electronic switches 231, . . . 232, . . . 23M, unlike the first embodiment.

For example, a probe driver 32 is to mechanically move the probe 21 in the X direction (lens direction).

The ultrasonic waves reflected by the patient are received by the same transducer element 211. This reception signal is amplified to have a proper amplitude and is supplied to first and second mixers 125a and 125b. The output signal from an oscillator 126 is also supplied to the first and second mixers 125a and 125b. The oscillation signal and the amplified signals are mixed in the first and second mixers 125a and 125b.

In this case, the output signal from the oscillator 126 is directly supplied to the first mixer 125a, whereas it is also supplied to the second mixer 125b through a phase shifter 127 where the phase of the oscillation signal is shifted by $\pi/2$. The outputs from the first and second mixers 125a and 125b are respectively supplied to low-pass filters (LPF) 128a and 128b which may eliminate high-frequency components. The signals filtered from the low-pass filters 128a and 128b are then stored in RAMs 131a and 131b through sample/hold (S/H) circuits 129a and 129b and A/D converters 130a and 130b, respectively. It should be noted that only the data signals which are used to reconstruct a C mode image at a given depth may be stored in the RAMs 131a and 131b.

In the next step, the transducer 21 is moved by a small step in the direction (X direction) perpendicular to the array direction, and the switching operation described above is performed. Scanning is then repeated in the same manner as in the first scanning step in the Y direction.

As a result, when mechanical movement of the transducer 21 is performed by M steps (M times), the signals stored in the RAMs 131a and 131b are supplied to a signal processing circuit 132 in which two-dimensional computation in accordance with equation (13) is performed with respect to the display plane S and the coordinate Zn. The computation results are then temporarily stored in the frame memory 36 and are then displayed on a display unit 38 such as a TV monitor. Reference numeral 39 denotes a main control circuit for controlling the component parts of the circuit. It should be noted that this main control circuit 39 also controls the ultrasonic probe 21, the probe driver 32, etc. as same as in the first embodiment.

The capacity of the memories used herein will now be explained.

$M \times N \times L$ data points are processed by and stored in the signal processing circuit 132. It should be noted that reference symbol L indicates the number of sampling points in the depth direction. If an 8-bit image signal corresponds to one point, the capacity of each of the RAMs 131a and 131b is $M \times N \times L$ bytes. Furthermore, if the operator wishes to simultaneously obtain H pieces of the C-mode images, the capacity of each of the RAMs 131a and 131b amounts to $M \times N \times L \times H$ bytes.

If the beam width $\beta$ of the transducer 21 is selectively small (e.g., less than 10°), one C-mode image can be obtained by data of $M \times N$ points.

The reference signal Sc used in this processing may be produced by the signal processing circuit 132 every time. However, such a reference signal may be previously stored in a memory such as a ROM, thereby further increasing the operation speed. It should be noted that the output signal from the oscillator 126 may also have a rectangular wave. In this case, the output signal can be easily phase-shifted by the phase shifter 127 by $\pi/2$.

When a plurality of C-mode tomographic images according to this embodiment is required, they can be displayed on the display, unit 34 one by one in turn, or simultaneously. Furthermore, these tomographic images can be taken by an X-ray film and can be kept for a long period of time, resulting in convenience for a later diagnosis.

According to this embodiment as described above, the resolution of the tomographic image does not depend on a distance (depth), thus obtaining the tomographic image of improved resolution.

Furthermore, according to the present invention, the phased-array type ultrasonic probe is moved to obtain the tomographic image, so that the immersed examination can be utilized in the diagnostic apparatus as reported by the present inventor in the proceedings of 1st Symposium on Ultrasonic Electronics, Tokyo, 1980 Japanese Journal of Applied Physics, Vol. 20 (1981) Supplement 20-3, pages 213 to 215, "Ultrasonic Mass-Screening System for Breast Examination".

As previously explained, although the focusing method for the Y direction according to the invention resembles the synthetic aperture method in the field of radar techniques, the electronic real-time focusing method is used for the array direction, which is one of the features of the present invention. Therefore, the synthetic aperture method involves one-dimensional processing, thus shorting the image reconstruction time.

It should be noted that the transmission/reception sensitivity of the probe along the lens direction preferably has no directivity to obtain higher resolution in the synthetic aperture method. To this end, the aperture size must be made small. More particularly, if the width of the transducer elements toward the lens direction is given as D, a uniform medium is used, and the attenuation of the ultrasonic waves is negligible, the lateral resolution $\Delta x$ at a given depth is $\Delta x \approx D/2$.

However, when the width of the transducer elements is made smaller, the following problems are caused:

(1) The sensitivity of transmission/reception is reduced.

(2) The transverse direction's vibration mode influences the thickness direction's vibration mode.

(3) It is difficult to manufacture a small width probe.

As an improvement of the above-mentioned probe, an arrangement will be described with reference to FIGS. 9A to 9E in which non-directive beams are obtained with keeping the width of the transducer elements large.

FIG. 9A shows a case in which the diameter of the probe in the lens direction is made small. Reference numeral 41 denotes a transducer element. FIGS. 9B and 9C show cases in which the beams are respectively focused by an acoustic lens 42 made of plastic e.g., Acrylite, similar to one in optics, or a concave transducer element 43 to be in the vicinity thereof and are then scattered, thus obtaining non-directive beams which are similar to that shown in FIG. 9A. FIGS. 9D and 9E show cases in which the scattered beams are obtained by means of a lens 44 and a concave transducer element 45, respectively.

Signal processing in these cases is then performed by assuming that small-width transducer elements would be positioned at an imaginary point Q (e.g., the focal point in FIGS. 9B and 9C).

While the invention has now been described in terms of certain preferred embodiments and exemplified with respect thereto, those of skill in the art will readily appreciate that various modifications, changes, omissions, and substitutions may be made without departing from the spirit of the invention.

For example, in the above embodiments, the synthesizing means for time-base processing the signal in the lens direction is used. However, an FFT (Fast Fourier Transform Circuit) may be used to transform the frequency of the signal.

In the above embodiments of the present invention, the linear scanning type probe is used. However, a sector probe may be mechanically moved to obtain the same effect.

What is claimed is:

1. An ultrasonic diagnostic apparatus for examining an object by utilizing ultrasonic waves, comprising:
   ultrasonic probe means including a plurality of ultrasonic transducer elements aligned in a line parallel to a first scanning direction for emitting fan-shaped ultrasonic waves;
   first control means for controlling the probe means to electrically scan the object by the fan-shaped ultrasonic waves in said first scanning direction such that a predetermined number of said transducer elements are excited to transmit the ultrasonic waves toward the object and ultrasonic echoes reflected from the object are derived as a plurality of echo signals from the transducer elements after first delay time corrections are given;
   first synthesizing means for electrically synthesizing said plurality of echo signals with an in-phase condition so as to derive a plurality of first scanning signals, whereby electrical focusing is achieved in the first scanning direction;
   means for mechanically and intermittently moving the ultrasonic probe means along a second scanning direction perpendicular to the first scanning direction so as to obtain said first scanning signals at given scanning positions over the second scanning direction;
   memory means for storing said plurality of first scanning signals derived from the first synthesizing means;
   second control means for controlling the memory means to read out said plurality of first scanning signals with second delay time corrections; and
   second synthesizing means for electrically synthesizing said plurality of first scanning signals with an in-phase condition so as to derive a plurality of second scanning signals, whereby electrical focusing is achieved in the second scanning direction.

2. An apparatus as claimed in claim 1, wherein:
   said first control means includes a plurality of analogue switches, a plurality of delay lines having variable delay times and connected via the respective analogue switches to respective of said plurality of ultrasonic transducer elements, and a scanning control circuit for selecting said analogue switches to be actuated and also said first delay times of the delay lines for said first delay time corrections;
   said memory means includes a plurality of random access memories;
   said second control means includes a delay time control circuit for designating addresses of said random access memories so as to read out said plurality of first scanning signals with said second delay time corrections; and
   said second synthesizing means includes an adder for summing said plurality of first scanning signals read out from said plurality of random access memories so as to derive said second scanning signals.

3. An apparatus as claimed in claim 2, further comprising:
   an envelope detector for detecting said second scanning signals derived from said adder;
   a frame memory for storing said envelope-detected second scanning signals so as to obtain a tomographic image signal of the object; and
   monitor means for displaying a tomographic image of the object based upon said tomographic image signal.

4. An apparatus as claimed in claim 3, wherein only the first scanning signals acquired from a scanning portion within the object in a given depth from a surface of the object are read out from said random access memories by said second control means, whereby a C-mode tomographic image is displayed on said monitor means.

5. An apparatus as claimed in claim 1, wherein said ultrasonic probe means comprises:
   a curved surface for diverging the ultrasonic waves toward the object in the second scanning direction.

6. An ultrasonic diagnostic apparatus as claimed in claim 1, wherein said ultrasonic probe means comprises:
   an acoustic lens for diverging the ultrasonic waves toward the object in the second scanning direction.

7. An ultrasonic diagnostic apparatus for examining an object by utilizing ultrasonic waves, comprising:
   ultrasonic probe means including a plurality of ultrasonic transducer elements aligned in a line parallel to a first scanning direction;
   first control means for controlling the probe means to electrically scan the object by the ultrasonic waves in said first scanning direction such that a predetermined number of said transducer elements are excited to transmit the ultrasonic waves toward the object and ultrasonic echoes reflected from the object are derived as a plurality of echo signals from the transducer elements after first delay time corrections are given;
   first synthesizing means for electrically synthesizing said plurality of echo signals with an inphase condition so as to derive a plurality of first scanning signals, whereby electrical focusing is achieved in the first scanning direction;
   means for mechanically and intermittently moving the ultrasonic probe means along a second scanning direction perpendicular to the first scanning direction so as to obtain said first scanning signals at given scanning positions over the second scanning direction;
   pulse generation mean including a $\pi/2$ phase shifter for producing first pulse signals and second pulse signals via the $\pi/2$ phase shifter, said first pulse signals having a phase different by $\pi/2$ from that of said second pulse signals;

a first combination of signal mixing and storing means for multiplying said first scanning signals from said first synthesizing means by said first pulse signals and for temporarily storing first mixed scanning signals;

a second combination of signal mixing and storing means connected parallel to said first combination for mixing said first scanning signals with said second pulse signals and for temporarily storing second mixed scanning signals; and signal processing means for performing convolutions on said first and second mixed scanning signals, whereby electrical focusing is achieved in the second scanning direction.

8. An apparatus as claimed in claim 7, wherein:

said first control means comprises a plurality of analogue switches connected to the respective transducer elements; and said storing means of said first and second combinations comprises random access memories.

9. An apparatus as claimed in claim 8, further comprising:

a frame memory for storing said second scanning signals so as to obtain a tomographic image signal of the object; and monitor means for displaying a tomographic image of the object based upon said tomographic image signal of the object.

10. An apparatus as claimed in claim 9, wherein only the first scanning signals acquired from a scanned portion within the object in a given depth from a surface of the object are read out from said random access memories, whereby a C-mode tomographic image is displayed on said monitor means.

11. An apparatus as claimed in claim 7, wherein said ultrasonic probe means comprises:

a curved surface for diverging the ultrasonic waves toward the object in the second scanning direction.

12. An apparatus as claimed in claim 7, wherein said ultrasonic probe means comprises:

an acoustic lens for diverging the ultrasonic waves toward the object in the second scanning direction.

* * * * *

UNITED STATES PATENT AND TRADEMARK OFFICE
CERTIFICATE OF CORRECTION

PATENT NO. : 4,542,746
DATED : September 24, 1985
INVENTOR(S) : Kinya Takamizawa It is certified that error appears in the above-identified patent and that said Letters Patent is hereby corrected as shown below:

Title page:

-- The priority information on this letters Patent is incorrect. Please add to this Letters Patent this priority number:

April 19, 1982　　Japan　　65217/82--

Signed and Sealed this

Fourteenth Day of January 1986

[SEAL]

Attest:

DONALD J. QUIGG

Attesting Officer　　Commissioner of Patents and Trademarks